United States Patent [19]

Howard et al.

[11] Patent Number: 4,559,214
[45] Date of Patent: Dec. 17, 1985

[54] PARTICULATE CALCIUM CARBONATE

[75] Inventors: Donald K. Howard, Manchester; Michael A. Finan, Macclesfield; Michael J. Lees, Manchester, all of England

[73] Assignee: Ciba Geigy Corporation, Ardsley, N.Y.

[21] Appl. No.: 583,075

[22] Filed: Feb. 23, 1984

[30] Foreign Application Priority Data

Feb. 25, 1983 [GB] United Kingdom ................. 8305346

[51] Int. Cl.$^4$ ........................... C01F 5/24; C01F 11/18
[52] U.S. Cl. ..................................... 423/430; 423/266; 423/431; 423/432; 106/306
[58] Field of Search ............... 423/430, 431, 432, 265, 423/267; 106/306

[56] References Cited

U.S. PATENT DOCUMENTS

| | | | |
|---|---|---|---|
| 3,810,834 | 5/1974 | Jones et al. | 210/58 |
| 4,018,877 | 4/1977 | Woode | 423/432 |
| 4,157,379 | 6/1979 | Arika et al. | 423/432 |
| 4,242,318 | 12/1980 | Brahm et al. | 423/430 |

FOREIGN PATENT DOCUMENTS

| | | | |
|---|---|---|---|
| 453900 | 1/1949 | Canada | 423/430 |
| 2816381 | 10/1978 | Fed. Rep. of Germany | 106/306 |
| 46-12292 | 3/1971 | Japan | 423/432 |
| 52-65660 | 12/1977 | Japan . | |

OTHER PUBLICATIONS

Surewson et al, Preparative Methods of Polymer Chemistry, Interscience, NY, NY, 1968, pp. 208–209, 229, 233, 239, 256, 259.

Encyclopedia of Polymer Science and Technology, John Wiley & Sons, NY, NY, vol. 1 (1964) pp. 75–77, 83, 355, 405, vol. 4 (1966) p. 165, vol. 7 (1967) p. 508.

Primary Examiner—Gary P. Straub
Attorney, Agent, or Firm—Luther A. R. Hall

[57] ABSTRACT

The invention provides particulate calcium carbonate having incorporated therein from 0.1 to 10% by weight, based on the weight of calcium carbonate, of polymaleic acid or a water-soluble salt thereof.

7 Claims, No Drawings

PARTICULATE CALCIUM CARBONATE

The present invention relates to calcium carbonate in a modified form; and to its production.

The surface treatment of calcium carbonate to modify its compatability and properties in aqueous and non-aqueous media is well known. Calcium carbonate can be treated with stearic acid to increase its compatability with polymers and rubbers. Calcium carbonate has been precipitated in the presence of a polyelectrolyte such as a polyacrylate to produce high solid content aqueous dispersions of calcium carbonate (U.S. Pat. No. 4,242,318).

There has also been described calcium carbonate in the form of spherical agglomerates of fine needle crystals, this form being generally referred to as round calcium carbonate particles.

We have now found surprisingly that treating calcium carbonate with polymaleic acid or its salts in aqueous solution followed by separating and drying the calcium carbonate forms a calcium carbonate powder which adheres as a thin film on contact with a variety of surfaces such as metal, wood, glass, rubber, paper and plastics as a result of developing a large static charge, and which has fluid-like properties in the dry state.

Agitation of the powder enhances the fluid effects. The dry modified calcium carbonate will flow through a narrow orifice, wave motions can be set up in the powder, and the powder will readily transmit shock waves.

Accordingly, the present invention provides particulate calcium carbonate having incorporated therein from 0.1 to 10% by weight, based on the weight of calcium carbonate of polymaleic acid or a water-soluble salt thereof.

The calcium carbonate of the present invention may be prepared by precipitating calcium carbonate in the presence of polymaleic acid or a salt thereof.

The calcium carbonate produced by the process of the invention has particles which are generally spherical and may have a particle size in the range of from 0.01 μm to 50 μm, e.g. from 0.5 μm to 20 μm. The optimum particle size is normally dependent on the intended application for the calcium carbonate.

The calcium carbonate particles produced by the process of the invention are highly porous with pore widths within the range of 0.5 nm to 200 nm, e.g. from 2 nm to 50 nm. As a result the particles have a very high surface area, especially when compared with calcium carbonate produced by precipitation process in the absence of polymaleic acid or a salt thereof.

The modified calcium carbonate is formed by precipitating calcium carbonate in the presence of polymaleic acid or a salt thereof by any of the known techniques such as carbonation of lime or by mixing solutions of a soluble calcium salt and a soluble carbonate to give a supersaturated solution of calcium carbonate, from which calcium carbonate precipitates.

The modified calcium carbonate may be formed by mixing concentrated aqueous solutions of a soluble calcium salt and a soluble carbonate in the presence of polymaleic acid or a salt thereof with efficient agitation during the precipitation stage. The polymaleic acid salt may be added to either or both of the solutions being mixed but it is preferably added to the calcium salt solution prior to mixing. Alternatively, the two solutions may be added to an aqueous solution of the polymaleic acid or salt. The precipitated calcium carbonate is in the form of small, charged spheres which have excellent fluid like properties in the dry state. The addition of polymaleic acid to the precipitation enhances the formation of spherical particles, reduces the degree of agglomeration of particles and narrows the particle size range. The particles obtained are porous spheres unlike the spherical agglomerates of fine needle crystals generally referred to as round calcium carbonate particles. The size of the spherical particles may be adjusted to meet different applications by altering the rate of mixing and/or degree of agitation during the precipitation.

The polymaleic acid used in producing the product of the invention may be a hydrolysed polymaleic anhydride having a molecular weight below 5000 such as that described in British Patent Specification No. 1 369 429 and may be in the form of a water-soluble salt e.g. an alkali metal salt. The amount of polymaleic acid used may be from 0.1% to 10% based on the weight of calcium carbonate. The preferred amount depends on the particle size or surface area of the calcium carbonate particles being formed. The smaller the particles, and hence the larger the surface area, the larger the amount of polymaleic acid or salt needed for best results. Substantially all of the polymaleic acid or salt thereof used becomes incorporated into the calcium carbonate. The actual means of incorporation is not known at present, but its presence can be detected by analysis.

The calcium carbonate of the invention is very suitable for use as a filler e.g. a light weight filler in papermaking, in paint and in the manufacture of plastics. It readily clings to most surfaces and is very effective as a dry lubricant. The treated calcium carbonate can be readily dyed with basic dyes and will adsorb transition metal ions such as copper from aqueous solution. It may also be used as a carrier for active additives such as antioxidants, light stabilisers, flame retardants, pesticides and pharmaceuticals. The dry modified calcium carbonate can also be used as a fluidised bed.

Another use is for thermal or acoustic insulation.

The invention is illustrated by the following Examples.

EXAMPLE 1

Preparation of modified calcium carbonates.

A first solution was made by dissolving 1140 parts by weight calcium chloride hexahydrate and 16.8 parts by weight polymaleic acid having a molecular weight of 705 and an acid value of 544 mg KOH/g (as a 50% w/w solution in water) in 5600 parts by weight water. A second solution was made by dissolving 541 parts by weight sodium carbonate (anhydrous) in 6200 parts by weight water.

The two solutions were added concurrently to a vessel, fitted with an efficient stirrer, over 10 minutes. The resulting suspension was stirred for 15 minutes and was then filtered. The product was then stirred with 3000 parts by weight water, filtered, washed with 1000 parts by weight water and dried to constant weight.

504.9 parts by weight of modified calcium carbonate were obtained, having a B.E.T.—nitrogen surface area of 23 $m^2 g^{-1}$. Analysis for organic carbon showed the presence of 1.73% organic carbon in the particles. Incorporation of all the polymaleic acid added would give an organic carbon content of 1.79%.

EXAMPLE 2

Preparation of unmodified calcium carbonate.

The unmodified calcium carbonate was prepared as described in Example 1 except that the polymaleic acid was omitted.

480 Parts by weight of calcium carbonate were obtained, having a B.E.T.—nitrogen surface area of 0.53 $m^2 g^{-1}$.

EXAMPLE 3

Sample of the products from Example 1 and 2 were run down a paper chute and the static charge developed on the paper was measured. The average charge from 15 separate runs was 98,000 volts per sq. meter for the product of Example 1 and 3,666 volts per sq. meter from the product of Example 2.

This reflects the high static charge carried by the modified calcium carbonate of the invention compared with ordinary calcium carbonate.

EXAMPLE 4

The products of Examples 1 and 2 were assessed for their flow properties by determining the smallest diameter hole through which they would flow. The product of Example 1 flowed without mechanical assistance through funnels with an outlet hole down to a diameter of 3 mm whereas the product of Example 2 would only flow through a funnel with an outlet hole having a diameter of at least 17 mm.

EXAMPLE 5

The products of Examples 1 and 2 were each placed on a flat horizontal surface which was then inclined slowly until the products began to flow. The angle at which flow began was measured. The product of Example 1 began to flow at an angle of 30° whilst the product of Example 2 only began to flow at an angle greater than 60° to the horizontal.

EXAMPLE 6

A 60° cone of the products of Examples 1 and 2 having an initial base area of 50.3 sq. cm were placed on a vibrating table and the maximum area achieved by each cone was measured. The product of Example 1 flowed and spread out to an area of 118.9 sq. cm whereas the product of Example 2 reached a maximum area of 78.6 sq. cm.

EXAMPLE 7

A 5 g sample of the products from Examples 1 and 2 were each dropped from a height of 6 cm on to a level surface, and the area of spread measured. The product of Example 1 spread to an area of 193.8 sq. cm whereas the product of Example 2 only spread to an area of 19.0 sq. cm.

Examples 4 to 7 all illustrate the generally improved flow properties of the modified calcium carbonate of the invention over ordinary calcium carbonate of similar particle size.

EXAMPLE 8

A first solution was made by dissolving 1140 parts by weight calcium chloride hexahydrate in 5600 parts by weight water. A second solution was made by dissolving 541 parts by weight sodium carbonate (anhydrous) in 6200 parts by weight water. The two solutions were added concurrently over 10 minutes to a vessel, fitted with an efficient stirrer and containing 16.8 parts by weight polymaleic acid, having a molecular weight of 705 and an acid value of 544 mg KOH/g, as a 50% w/w solution in water.

The product was recovered as described in Example 1 and had properties similar to those of the product of Example 1.

Analysis for organic carbon showed the presence of 1.85% organic carbon. Incorporation of all the polymaleic acid added would give an organic carbon content of 1.79%.

EXAMPLE 9

111 Parts by weight calcium hydroxide were slurried with stirring in 1000 parts by weight of water. Carbon dioxide gas was bubbled through the slurry until the pH of the slurry dropped to and stabilized at 7. 9.5 Parts by weight polymaleic acid having a molecular weight of 705 and an acid value of 544 mg KOH/g (as a 50% w/w solution in water) were slowly added during the carbonation. During this period the slurry was cooled as necessary to maintain it at a temperature of approximately 40° C. The resulting suspension was filtered, washed with 1000 parts by weight of water and dried to constant weight.

140.5 Parts by weight of modified calcium carbonate were obtained, and had properties similar to those of the product of Example 1.

What we claim is:

1. A dry particulate calcium carbonate composition, having a particle size in the range of 0.01 $\mu$m to 50 $\mu$m and having pores within the range of 0.5 nm to 200 nm, which comprises
   calcium carbonate, and
   0.1 to 10% by weight, based on the weight of calcium carbonate, of polymaleic acid or a water-soluble salt thereof,
   wherein the calcium carbonate is formed by precipitating in the presence of said polymaleic acid or a water-soluble salt thereof.

2. Particulate calcium carbonate as claimed in claim 1, in which the polymaleic acid or salt thereof is a hydrolysed polymaleic anhydride and has a molecular weight below 5000.

3. Particulate calcium carbonate as claimed in claim 1 having a particle size of from 0.5 $\mu$m to 20 $\theta$m.

4. Particulate calcium carbonate as claimed in claim 1 having pores within the range of 2 nm to 50 nm.

5. A process for preparing particulate calcium carbonate as claimed in claim 1, which comprises precipitating calcium carbonate in the presence of polymaleic acid or a salt thereof.

6. A process as claimed in claim 5 which comprises the carbonation of lime.

7. A process as claimed in claim 5 which comprises mixing a solution of a soluble calcium salt with a solution of a soluble carbonate.

* * * * *